United States Patent
Walston et al.

(10) Patent No.: US 10,619,514 B2
(45) Date of Patent: Apr. 14, 2020

(54) CERAMIC MATRIX COMPOSITE ASSEMBLY WITH COMPLIANT PIN ATTACHMENT FEATURES

(71) Applicant: Rolls-Royce Corporation, Indianapolis, IN (US)

(72) Inventors: Jeffrey A. Walston, Indianapolis, IN (US); Daniel K. Vetters, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 211 days.

(21) Appl. No.: 15/787,395

(22) Filed: Oct. 18, 2017

(65) Prior Publication Data

US 2019/0112947 A1 Apr. 18, 2019

(51) Int. Cl.
*F01D 25/24* (2006.01)
*F01D 11/08* (2006.01)
*F01D 25/00* (2006.01)

(52) U.S. Cl.
CPC ............ *F01D 25/246* (2013.01); *F01D 11/08* (2013.01); *F01D 25/005* (2013.01); *F05D 2220/32* (2013.01); *F05D 2230/64* (2013.01); *F05D 2230/642* (2013.01); *F05D 2230/90* (2013.01); *F05D 2240/11* (2013.01); *F05D 2260/30* (2013.01); *F05D 2260/36* (2013.01); *F05D 2300/10* (2013.01); *F05D 2300/501* (2013.01); *F05D 2300/6033* (2013.01)

(58) Field of Classification Search
CPC .................................................... F01D 25/246
See application file for complete search history.

(56) References Cited

U.S. PATENT DOCUMENTS

| 5,405,244 | A | 4/1995 | Boyd |
| 6,942,203 | B2 | 9/2005 | Schroder et al. |
| 7,722,317 | B2 | 5/2010 | Schiavo et al. |
| 9,175,571 | B2* | 11/2015 | Floyd .................... F01D 5/284 |
| 9,587,517 | B2* | 3/2017 | Vetters .................. F01D 25/246 |
| 9,598,975 | B2 | 3/2017 | Uskert et al. |
| 9,863,265 | B2* | 1/2018 | Stapleton .............. F04D 29/321 |
| 2004/0047726 | A1 | 3/2004 | Morrison |
| 2004/0062639 | A1 | 4/2004 | Glynn et al. |
| 2004/0188947 | A1 | 9/2004 | Paprotna |
| 2005/0129499 | A1 | 6/2005 | Morris et al. |
| 2006/0067815 | A1 | 3/2006 | Ghasripoor et al. |
| 2007/0031258 | A1 | 2/2007 | Campbell et al. |
| 2012/0260670 | A1 | 10/2012 | Foster et al. |

(Continued)

FOREIGN PATENT DOCUMENTS

| EP | 1124039 A1 | 8/2001 |
| EP | 2357322 A2 | 8/2011 |

(Continued)

*Primary Examiner* — Justin D Seabe
*Assistant Examiner* — John S Hunter, Jr.
(74) *Attorney, Agent, or Firm* — Barnes & Thornburg LLP

(57) ABSTRACT

An assembly adapted for use in a gas turbine engine. The assembly includes a support component comprising metallic materials, a supported component comprising ceramic matrix composite materials, and an attachment pin configured to couple the supported component to the support component. The attachment pin includes compliant features to distributes loads applied to the supported component.

13 Claims, 7 Drawing Sheets

(56) References Cited

U.S. PATENT DOCUMENTS

| | | |
|---|---|---|
| 2013/0064667 A1 | 3/2013 | Campbell et al. |
| 2013/0243601 A1 | 9/2013 | Floyd |
| 2014/0147266 A1 | 5/2014 | Kramer |
| 2014/0271147 A1 | 9/2014 | Uskert et al. |
| 2015/0377050 A1 | 12/2015 | Freeman et al. |
| 2016/0138407 A1 | 5/2016 | Freeman |
| 2016/0186611 A1* | 6/2016 | Vetters ............... F01D 25/246 415/173.2 |
| 2016/0290140 A1 | 10/2016 | Thomas et al. |
| 2017/0145845 A1 | 5/2017 | Vetters et al. |
| 2017/0175572 A1 | 6/2017 | Vetters |
| 2017/0321567 A1 | 11/2017 | Vetters et al. |

FOREIGN PATENT DOCUMENTS

| | | |
|---|---|---|
| EP | 2631434 A2 | 8/2013 |
| EP | 3103963 A1 | 12/2016 |
| EP | 3103964 A1 | 12/2016 |
| EP | 3103971 A1 | 12/2016 |
| EP | 3106620 A1 | 12/2016 |
| EP | 3106630 A1 | 12/2016 |
| EP | 3173583 A1 | 5/2017 |
| FR | 2962156 A1 | 1/2012 |
| WO | 2015191186 A1 | 12/2015 |

\* cited by examiner

CERAMIC MATRIX COMPOSITE ASSEMBLY WITH COMPLIANT PIN ATTACHMENT FEATURES

FIELD OF THE DISCLOSURE

The present disclosure relates generally to gas turbine engines, and more specifically to mechanical attachment features used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds and other assemblies sometimes include components made from ceramic matrix composites designed for use in high temperature environments. Due to the material properties of ceramic matrix composites, coupling such composite components to metallic parts of the assembly can present challenges.

SUMMARY

The present disclosure may comprise one or more of the following features and combinations thereof.

According to one aspect of the present disclosure, a turbine shroud adapted to be mounted outward of blades included in a turbine wheel assembly and block gasses from passing over the blades without interacting with the blades is described. The turbine shroud includes a carrier segment comprising metallic materials and a blade track segment comprising ceramic matrix composite materials. The carrier segment is configured to be mounted to other metallic components within the gas turbine engine. The blade track includes a runner that extends partway around a central axis to face a primary gas path of the gas turbine engine and an attachment feature.

In illustrative embodiments, the turbine shroud may include an attachment pin configured to couple the blade track segment to the carrier segment. The attachment pin may include a shaft comprising metallic materials that extends through an eyelet in the attachment feature of the blade track segment and a compliant wrap that extends around the shaft along at least a portion of the shaft arranged inside the eyelet. The compliant wrap may have greater material compliance than the shaft so that loads applied onto the blade track segment by the attachment pin are distributed along the attachment feature of the blade track segment.

In illustrative embodiments, the attachment pin may include locator shoulders comprising metallic materials that extend out from the shaft to directly engage the attachment feature of the blade track segment. The compliant wrap may be arranged along a length of the attachment pin between the locator shoulders.

In illustrative embodiments, the compliant wrap may include a plurality of wrap sections. The plurality of wrap sections may include a first wrap section arranged between the locator shoulders, a second wrap section arranged forward of the locator shoulders, and a third wrap section arranged aft of the locator shoulders.

In illustrative embodiments, the carrier segment may be formed to include a forward mount aperture and an aft mount aperture. The attachment feature of the blade track segment may be located so that the eyelet of the blade track segment aligns with the forward mount aperture and the aft mount aperture. The attachment pin may extend into the forward mount aperture and the aft mount aperture with the second wrap section arranged in the forward mount aperture and the third wrap section arranged in the aft mount aperture.

In illustrative embodiments, the carrier segment may be formed to include a forward mount aperture and an aft mount aperture. The attachment feature of the blade track segment may be located so that the eyelet of the blade track segment aligns with the forward mount aperture and the aft mount aperture. The attachment pin may extend into the forward mount aperture and the aft mount aperture with forward and aft portions of the shaft included in the attachment pin directly engaging the carrier segment.

In illustrative embodiments, undercuts may be formed in the shaft of the attachment pin. A first undercut may be located in a first location along the attachment pin between the locator shoulders and the forward portion of the shaft. A second undercut may be located in a second location along the attachment pin between the locator shoulders and the aft portion of the shaft.

In illustrative embodiments, the blade track segment may include a second attachment feature with an eyelet formed therethrough. The eyelets of the attachment features included in the blade track segment may extend parallel to the central axis and may be circumferentially spaced apart from one another about the central axis. The turbine shroud may further comprise a second attachment pin including a shaft comprising metallic materials that extends through the eyelet in the second attachment feature of the blade track segment and a compliant wrap that extends around the shaft along at least a portion of the shaft arranged inside the eyelet. The compliant wrap of the second attachment pin may have greater material compliance than the shaft of the second attachment pin.

According to another aspect of the present disclosure, a turbine shroud adapted for use in a gas turbine engine may include a carrier comprising metallic materials and a blade track segment comprising ceramic matrix composite materials. The blade track segment may include a runner that extends partway around a central axis and an attachment feature with an opening formed therethrough.

In illustrative embodiments, the turbine shroud may include an attachment pin configured to couple the blade track segment to the carrier segment. The attachment pin may include a shaft that extends through the opening in the attachment feature of the blade track segment and a compliant wrap that extends around the shaft along at least a portion of the shaft arranged inside the opening. The compliant wrap may have greater material compliance than the shaft.

In illustrative embodiments, the carrier segment may be formed to include a forward mount aperture and an aft mount aperture. The attachment feature of the blade track segment may be located so that the opening of the blade track segment aligns with the forward mount aperture and the aft mount aperture. The attachment pin may extend into the forward mount aperture and the aft mount aperture.

In illustrative embodiments, the compliant wrap may include a plurality of wrap sections. A first wrap section may be arranged inside the opening of the attachment feature included in the blade track segment. A second wrap section may be arranged inside the forward mount aperture of the carrier segment. A third wrap section may be arranged inside the aft mount aperture of the carrier segment.

In illustrative embodiments, the attachment pin may extend into the forward mount aperture and the aft mount aperture. Forward and aft portions of the shaft included in the attachment pin may directly engage the carrier segment around the forward mount aperture and the aft mount aperture.

In illustrative embodiments, undercuts may be formed in the shaft of the attachment pin. A first undercut may be located in a first location arranged radially inward of and axially aligned with a forward edge of the opening defined by the attachment feature of the blade track segment. A second undercut may be located in a second location arranged radially inward of and axially aligned with an aft edge of the opening defined by the attachment feature of the blade track segment.

In illustrative embodiments, the attachment pin may include locator shoulders that extend out from the shaft to directly engage the attachment feature of the blade track segment. The compliant wrap may be arranged along a length of the attachment pin between the locator shoulders. The compliant wrap may include a plurality of wrap sections. A first wrap section may be arranged between the locator shoulders. A second wrap section may be arranged forward of the locator shoulders. A third wrap section may be arranged aft of the locator shoulders.

In illustrative embodiments, the opening of the attachment feature included in the blade track segment may be an eyelet that defines a passageway through the attachment feature. The attachment feature may be formed to include a chamfer around an insertion end of the eyelet shaped to compress the compliant wrap when the attachment pin is inserted into the insertion end of the eyelet.

According to another aspect of the present disclosure, a turbine shroud adapted for use in a gas turbine engine may include a carrier comprising metallic materials and a blade track segment comprising ceramic matrix composite materials. The blade track segment may include a runner that extends partway around a central axis and an attachment feature with an opening formed therethrough. The turbine shroud may also include an attachment pin configured to couple the blade track segment to the carrier segment. The attachment pin may include a shaft that extends through the opening in the attachment feature of the blade track segment and into the carrier. The attachment pin may be formed to include slots in at least a portion of the shaft that extends into the carrier.

In illustrative embodiments, the attachment pin may include shoulders that extend out from the shaft and into direct contact with the carrier. The slots may extend through the shoulders.

According to a more general aspect of the present disclosure, an assembly adapted for use in a gas turbine engine may include a support component comprising metallic materials and a supported component comprising ceramic matrix composite materials. The supported component includes a heat shield portion adapted to face high temperature gasses and an attachment feature.

In illustrative embodiments, the assembly may include an attachment pin configured to couple the supported component to the support component. The attachment pin may include a shaft that extends through an opening in the attachment feature of the supported component and a compliant wrap that extends around the shaft. The compliant wrap may be located along at least a portion of the shaft arranged inside the opening. The compliant wrap may have greater material compliance than the shaft.

In illustrative embodiments, the attachment pin may include locator shoulders that extend out from the shaft. The locator shoulders may directly engage the attachment feature of the supported component.

In illustrative embodiments, the assembly may include a slotted attachment pin configured to couple the supported component to the carrier segment. The attachment pin may include a shaft that extends through the opening in the attachment feature of the supported component and into the support component. The attachment pin may be formed to include slots in at least a portion of the shaft that extends into the support component.

In illustrative embodiments, the attachment pin may include shoulders that extend out from the shaft and into direct contact with the supported component. The slots may extend through the shoulders.

These and other features of the present disclosure will become more apparent from the following description of the illustrative embodiments.

DETAILED DESCRIPTION OF THE DRAWINGS

Figure 1:
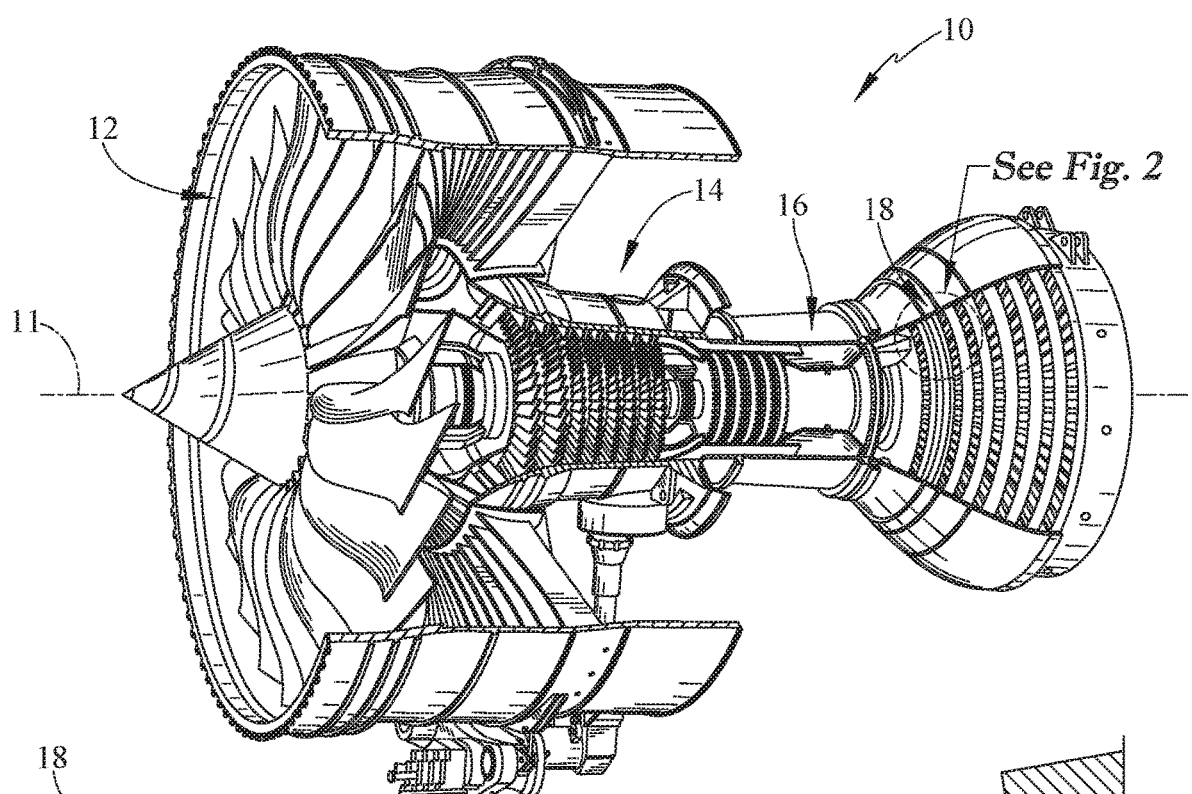
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
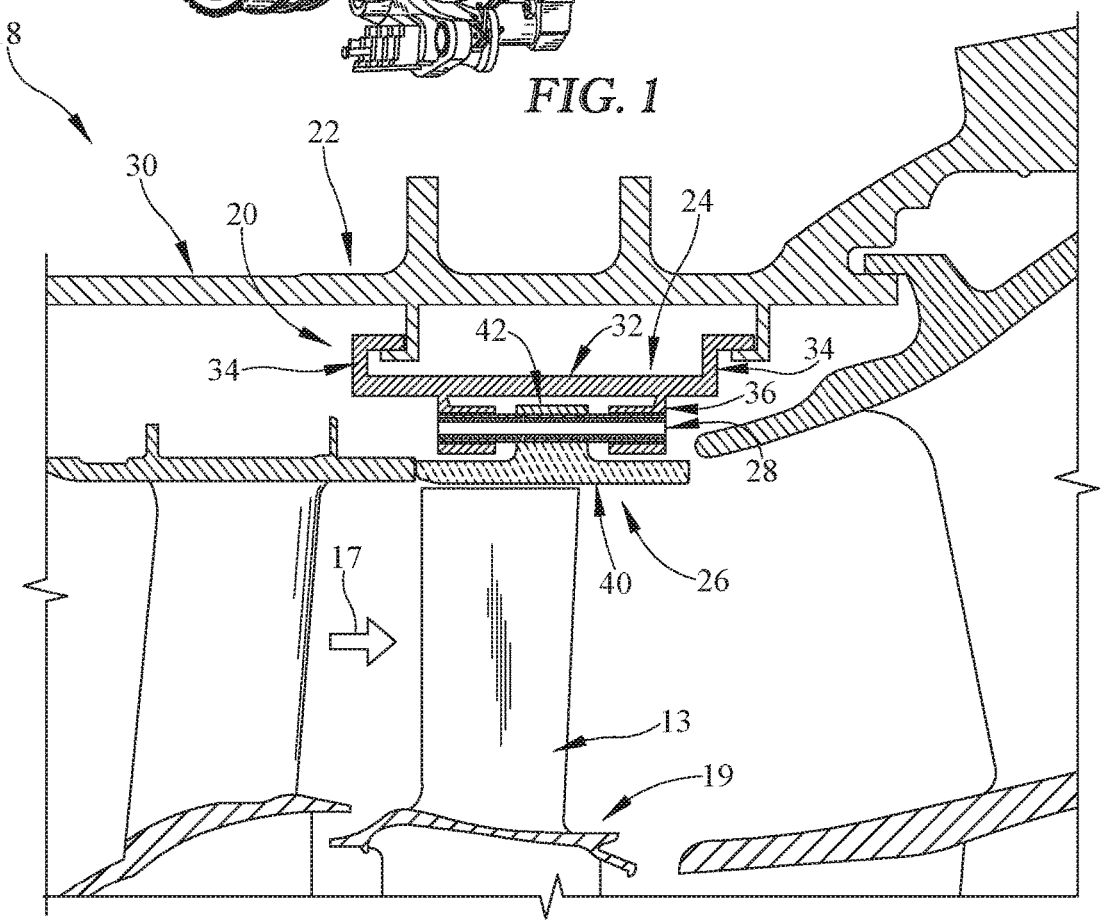
FIG. 2 is a partial cross-sectional view of the gas turbine engine of FIG. 1 showing the arrangement of a segmented turbine shroud radially outward of blades included in a turbine wheel assembly to suggest that the turbine shroud blocks gasses from passing over the blades without interacting with the blades.

The turbine 18 includes at least one turbine wheel assembly 19 and a turbine shroud 20 positioned to surround the turbine wheel assembly 19 as shown in FIGS. 1 and 2. The turbine shroud 20 is coupled to an outer case 30 of the gas turbine engine 10. The turbine wheel assembly 19 includes a plurality of blades 13 coupled to a rotor disk for rotation therewith. The hot, high pressure combustion products from the combustor 16 are directed toward the blades 13 of the turbine wheel assemblies 19 along a flow path 17. The blades 13 are in turn pushed by the combustion products to cause the turbine wheel assembly 19 to rotate; thereby, driving the rotating components of the compressor 14 and/or the fan 12.

Figure 3:
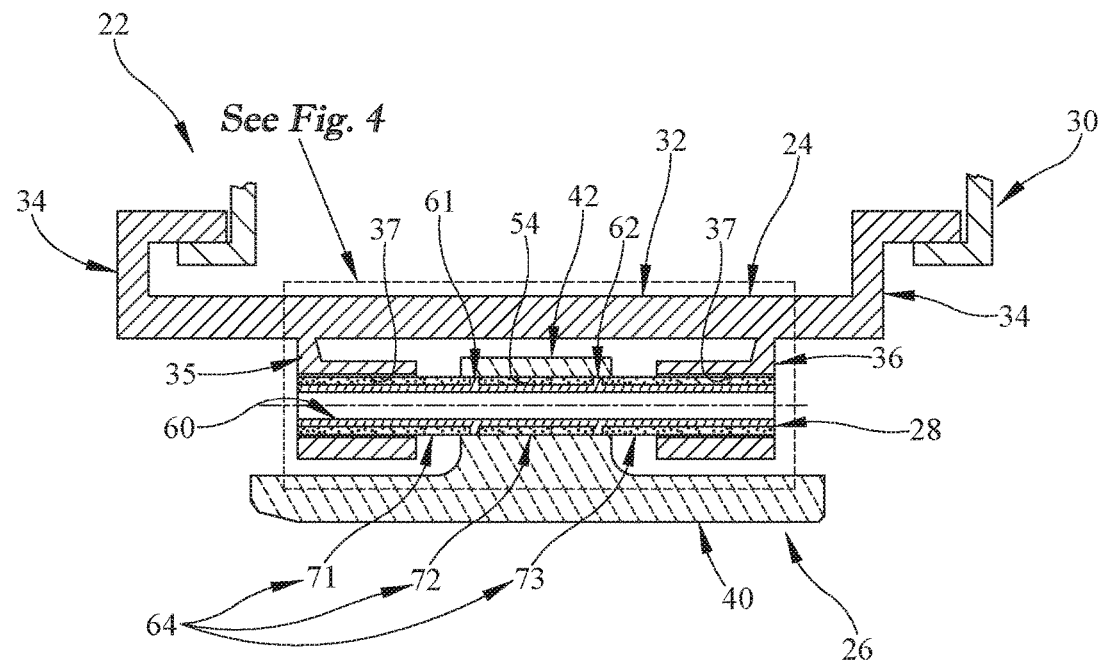
FIG. 3 is a detail view of a portion of FIG. 2 showing a turbine shroud segment that includes a carrier segment made from metallic materials, a blade track segment made from ceramic matrix composite materials, and attachment pins with compliant features that couples the turbine shroud segment to the carrier segment while spreading out mounting/pressure loads created along the attachment pins.
Figure 4:
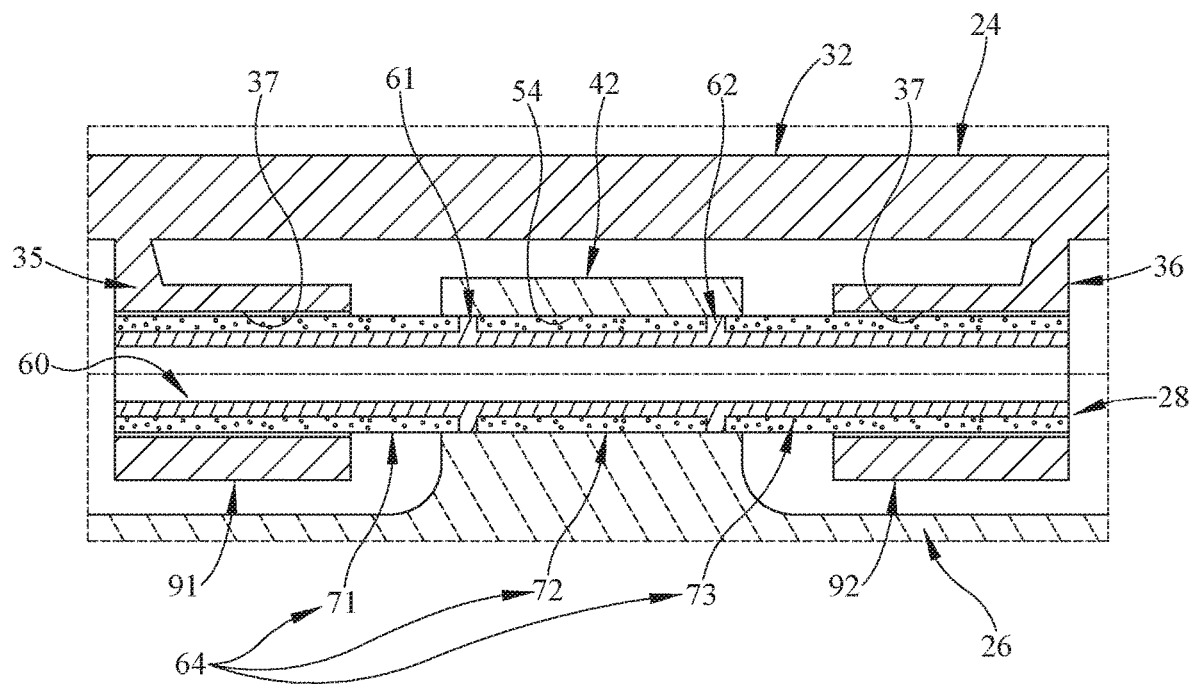
FIG. 4 is a further detail view of FIGS. 2 and 3 showing that each attachment pin includes a shaft, locator shoulders that extend out from the shaft to engage the blade track segment, and compliant wraps that extend around the shaft adjacent to the locator shoulders to distribute mounting load along the length of the attachment pin.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis 11 and cooperate to surround the turbine wheel assembly 11. The shroud segments 22 are sealed against one another, such as by strip seal members, to provide a continuous turbine shroud 20. In certain embodiments, certain components of the turbine shroud 20 are segmented while other components are annular and non-segmented.

Each shroud segment 22 includes a carrier segment 24, a blade track segment 26, and an attachment pin 28 configured to couple the blade track segment 26 to the carrier segment 24 as shown in FIGS. 3 and 4. The carrier segment 24 is a metallic support component configured to interface with other metallic components spaced from the primary gas path of the engine 10. The blade track segment 26 is a ceramic matrix composite component configured to directly face the high temperatures of the primary gas path. The attachment pin 28 includes compliant features (e.g. compliant wrap 54) that distributes loads across the blade track segment 26 to facilitate incorporation of ceramic matrix composites in this component.

The carrier segment 24 included in each shroud segment 22 is coupled to an outer case 30 of the engine 10 as shown in FIG. 2. Each carrier segment 24 illustratively includes a body plate 32, hangers 34, and support flanges 35, 36 as shown in FIG. 3. The body plate 32 extends partway around the axis 11. The hangers 34 extend radially outward from the body plate 32 and engage the outer case 30 to couple the turbine shroud segment 22 to the rest of the engine 10. A forward support flange 35 extends radially inward from the body plate. An aft support flange 36 is spaced aft of the forward support flange 35 along the axis 11 and extends radially inward from the body plate 32. Each of the support flanges 35, 36 is formed to include a cantilevered bore tube 91, 92 with a mount aperture 37 sized to receive forward/aft portions of the attachment pin 28 as shown in FIG. 3.

The blade tracks segment 26 of each shroud segment 22 comprises ceramic matrix composite materials as suggested in FIGS. 2 and 4. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment 42. The runner 40 arcuate and extends partway around axis 11 adjacent to turbine blades 13. The attachment 42 extends radially outward from the runner 40 to provide structure for coupling the blade track segment 26 to the carrier segment 24.

Figure 5:
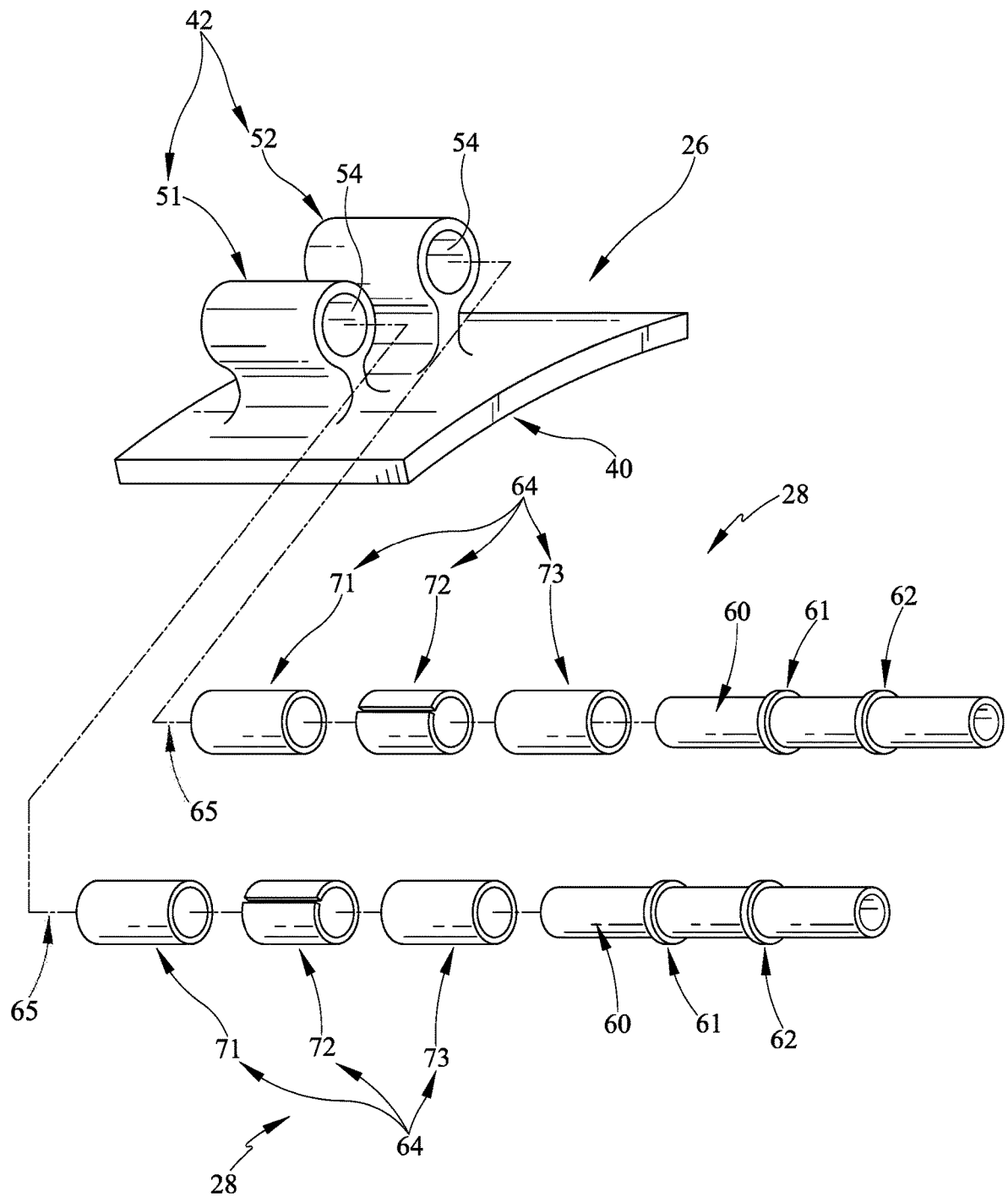
FIG. 5 is an exploded perspective assembly view of the blade track segment and the attachment pins showing that the blade track segment includes a runner adapted to face high temperature gasses in the turbine and attachment posts formed to include eyelets sized to receive the attachment pins.

In the illustrative embodiment, the attachment 42 of the blade track segment 26 includes two attachment posts 51, 52 as shown in FIG. 5. The attachment posts 51, 52 are circumferentially spaced apart from one another and extend part-way across the runner 40 in the axial direction parallel to the central axis 11. Each attachment post 51, 52 is formed to include an eyelet 54 sized to receive an attachment pin 28. When a segment 22 is assembled, the attachment posts 51, 52 are located so that the eyelets 54 are aligned with mount apertures 37 of the support flanges 35, 36 included in the carrier segment 24 and attachment pins 28 are inserted through apertures 37/eyelets 54 to couple the blade track segments 26 to the carrier segments 24.

The attachment pins 28 are configured to distribute mounting and pressure loads applied to the attachment 42 of the blade track segment 26 to account for material properties of the ceramic matrix composite. Each attachment pin 28 illustratively includes a shaft 60, locator shoulders 61, 62, and a compliant wrap 64 as shown in FIGS. 4 and 5. The shaft 60 extends along an axis 65 through forward/aft support apertures 37 and eyelet 54. The locator shoulders 61, 62 extend out from the shaft 60 and directly engages a corresponding attachment post 51, 52 along the interior of the eyelet 54 to provide a hard stop location for the blade track segment 26. The compliant wrap 64 extends around the shaft 60 along a portion of the shaft 64 arranged inside the eyelet 54. The compliant wrap 64 has greater material compliance than the shaft 60 so that loads applied onto the blade track segment 26 by the attachment pin 28 are distributed along the attachment 42 of the blade track segment 26.

The shaft 60 and the locator shoulders 61, 62 are illustratively made from metallic materials and are integrally formed as a one-piece component as shown in FIGS. 4 and 5. The shaft 60 illustratively has a round, tubular shape but in other embodiments may have a different cross-sectional shape (rectangular, oval, etc.) and may be solid.

The compliant wrap 64 includes a plurality of wrap sections 71, 72, 73 as shown in FIG. 5. A wrap section 71 is arranged forward of the locator shoulders 61, 62 and is located in the aperture 37 of the forward support flange 35 included the carrier segment 24 to distribute loads therein. Another wrap section 72 is arranged between the locator shoulders 61, 62 and is located in the eyelet 54 of the blade track segment 26. Yet another wrap section 73 is arranged aft of the locator shoulders 61, 62 and is located in the aperture 37 of the aft support flange 36 included in the carrier segment 26 to distribute loads.

When mounting ceramic matrix composite (CMC) components in turbine engines (i.e. engine 10), difficulties can arise when attempting to mitigate highly concentrated contact loads. One means of doing so includes the use of high-temperature capability complaint materials.

As shown in FIGS. 2-5, the complaint layer or wrap 64 enables a predictable distribution of load between the CMC blade track segment 26 and the pin 28 at the bore of the eyelet 54. This would serve to reduce stresses associated with the mounting of the blade track segment 26 in the engine 10.

The compliant layer 64 pieces 71, 72, 73 are shown with split construction so the arms of the pieces 71, 72, 73 can be spread apart and assembled over the diameter of the shaft 60, prior to assembly into the bore of the eyelet 54. Optionally, the end pieces 71, 73, and perhaps even the central piece 72, could be full hoops if desired.

Possible compliant wraps 64 could be a high temperature, flexible material such as INTERAM® material available from 3M®. The compliant material may be wrapped in foil to improve durability. Another possible compliant wrap 64 would be a high temperature sheet alloy such as Waspaloy or Rene-41 which is formed into a split wave spring ring (undulations running circumferentially).

Figure 6:
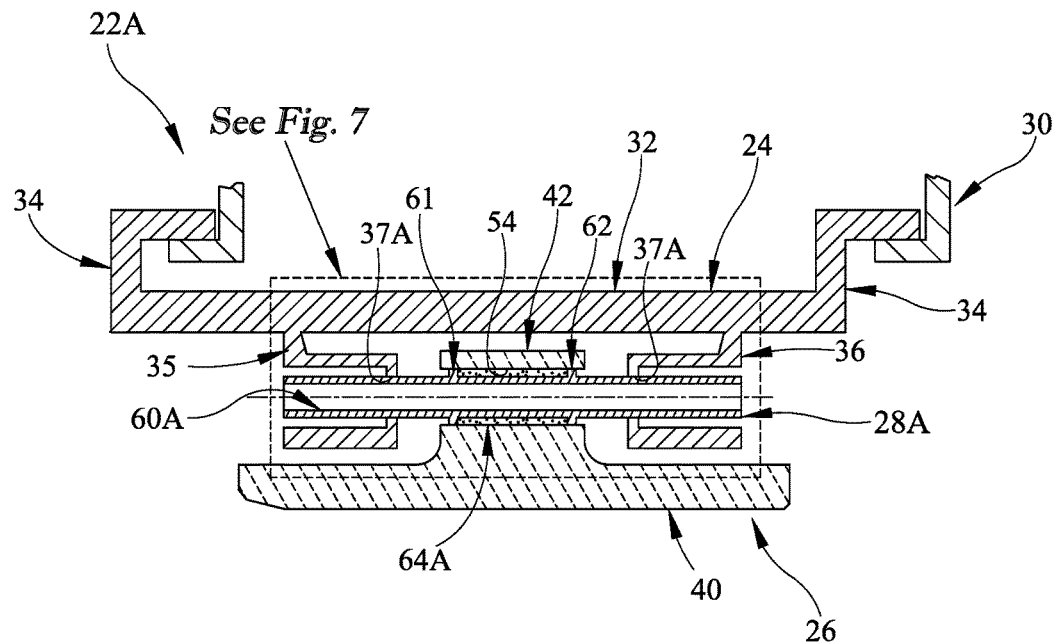
FIG. 6 is a view similar to FIG. 3 including a second turbine shroud segment adapted for use in the gas turbine engine of FIG. 1 showing a turbine shroud segment that includes a carrier segment made from metallic materials, a blade track segment made from ceramic matrix composite materials, and attachment pins with compliant features that couples the turbine shroud segment to the carrier segment while spreading out mounting/pressure loads applied on the ceramic matrix composite of the blade track segment.
Figure 7:
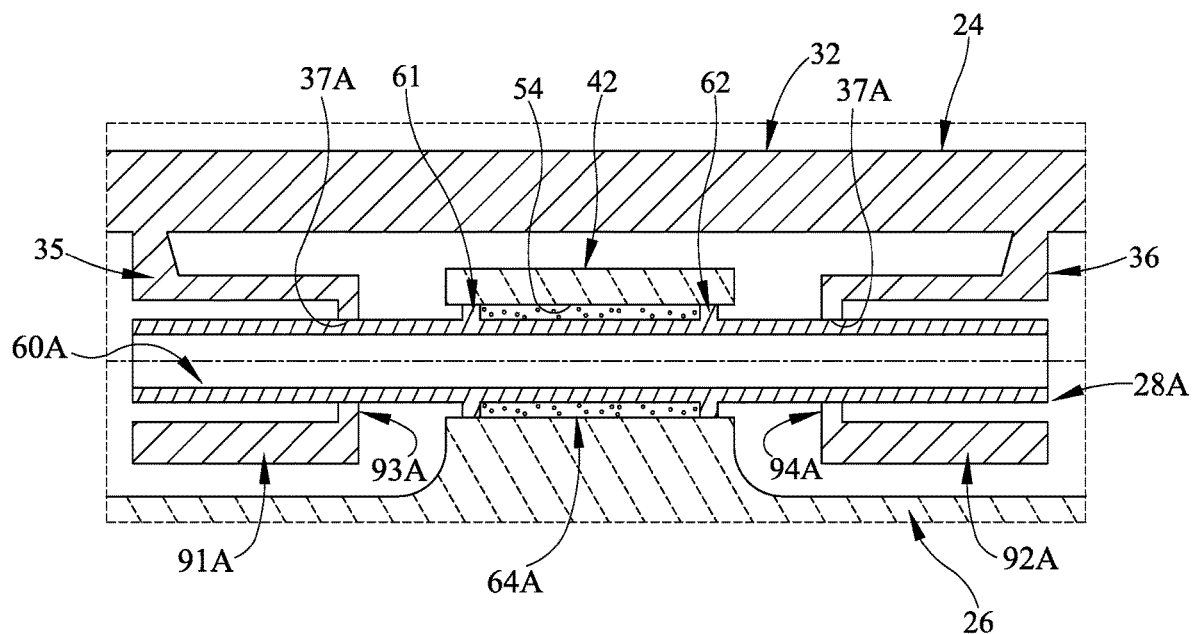
FIG. 7 is a detail view of FIG. 6 showing that each attachment pin includes a shaft, locator shoulders that extend out from the shaft to engage the blade track segment, and a compliant wrap that extend around the shaft between the locator shoulders to distribute mounting load along the attachment feature of the ceramic matrix composite blade track segment.

A second embodiment of a turbine shroud segment 22A adapted for use in a turbine shroud is shown in FIGS. 6 and 7. The second embodiment is substantially similar to the turbine shroud segment 22 shown and described in relation to FIGS. 1-5. In view of this similarity, common reference numbers indicate similar features.

Unlike turbine shroud segment 22, the turbine shroud segment 22A does not include compliant wrap pieces that interface with the carrier segment 24 as shown in FIGS. 6 and 7. Rather, compliant wrap 64A of attachment pin 28A is sized and arranged in eyelet 54 of blade track segment 26 to engage only the blade track segment 26. Accordingly, apertures 37A of the forward and aft support flanges 35, 36 included in the carrier segment 24 are sized to directly engage the shaft 60 of the attachment pin 28A.

In this embodiment, the flanges 35, 36 of the carrier segment 24 are each optionally formed to include a cantilevered bore tubes 91A, 92A and an engagement shoulder 93A, 94A. The cantilevered bore tubes 91A, 92A have some flexibility relative to the rest of the carrier segment 24. The engagement shoulders 93A, 94A extend radially into the cantilevered bore tubes 91A, 92A and directly engage the shaft 60A of the attachment pin 28A. Accordingly, the cantilevered bore tubes 91A, 92A provide some compliance for the assembly segment 22A.

Figure 8:
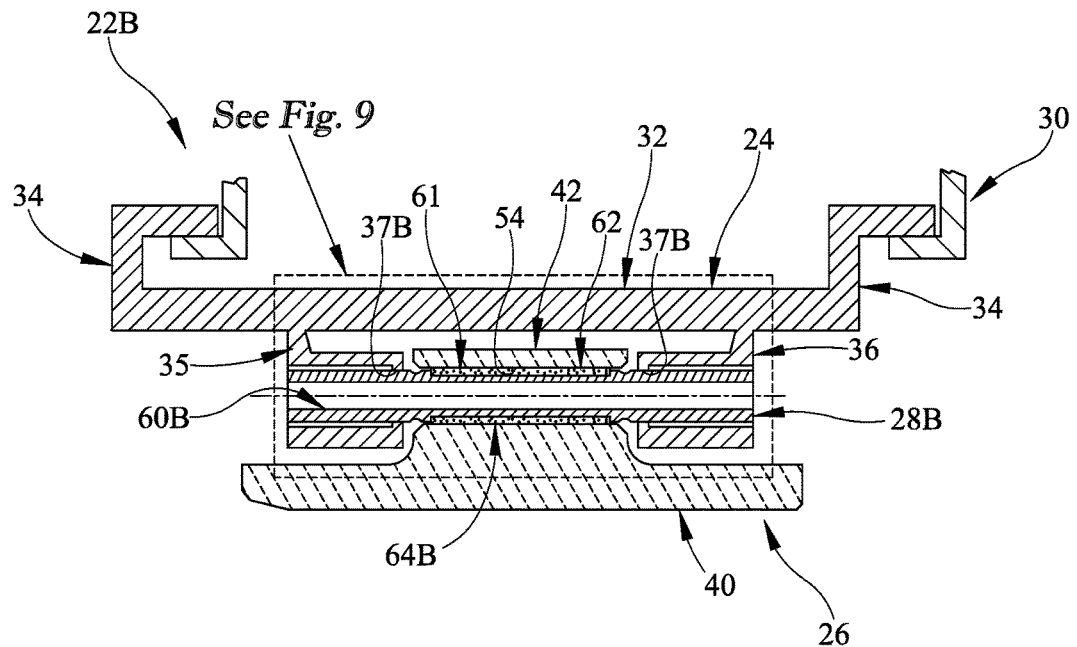
FIG. 8 is a view similar to FIG. 3 including a third turbine shroud segment adapted for use in the gas turbine engine of FIG. 1 showing a turbine shroud segment that includes a carrier segment made from metallic materials, a blade track segment made from ceramic matrix composite materials, and attachment pins with compliant features that couples the turbine shroud segment to the carrier segment while spreading out mounting/pressure loads applied on the ceramic matrix composite of the blade track segment.
Figure 9:
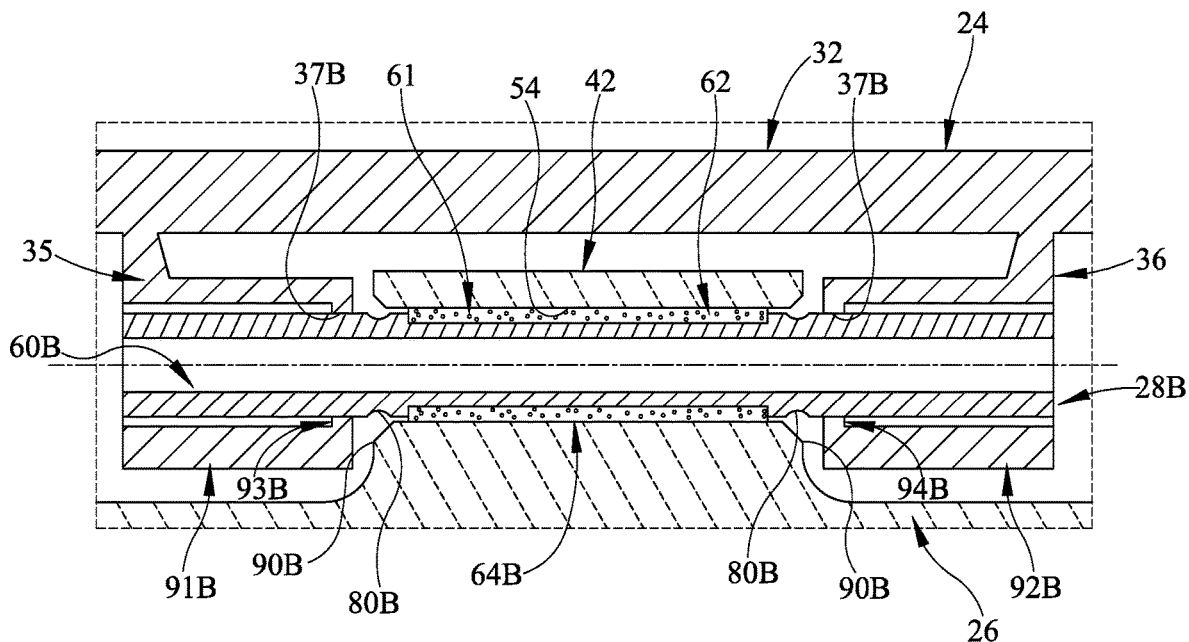
FIG. 9 is a detail view of FIG. 8 showing that each attachment pin includes a shaft, locator shoulders that extend out from the shaft to engage the blade track segment, and a compliant wrap that extend around the shaft between the locator shoulders, and further showing undercuts formed adjacent to the locator shoulders to avoid edge loading the ceramic matrix composite of the blade track segment.

A third embodiment of a turbine shroud segment 22B adapted for use in a turbine shroud is shown in FIGS. 8 and 9. The third embodiment is substantially similar to the turbine shroud segment 22 shown and described in relation to FIGS. 1-5. In view of this similarity, common reference numbers indicate similar features.

Unlike turbine shroud segment 22, the turbine shroud segment 22B does not include compliant wrap pieces that interface with the carrier segment 24 as shown in FIGS. 8 and 9. Rather, compliant wrap 64B of attachment pin 28B is sized and arranged in eyelet 54 of blade track segment 26 to engage only the blade track segment 26. Accordingly, apertures 37B of the forward and aft support flanges 35, 36 included in the carrier segment 24 are sized to directly engage shaft 60B of the attachment pin 28B. Indeed, in the embodiment of FIGS. 8 and 9, the shaft 60B of the attachment pin 28B is sized such that the diameter of the shaft 60B generally matches the diameter of the locator shoulders 61, 62 to rigidify the shaft 60B at its interface with the carrier segment 24.

Optionally, undercuts 80B are formed in the shaft 60B of the attachment pin 28B as shown in FIG. 9. A first undercut 80B is located in a first location along the attachment pin 60B between the locator shoulders 61, 62 and a forward portion of the shaft 60B. A second undercut 80B is located in a second location along the attachment pin 60B between the locator shoulders 61, 62 and an aft portion of the shaft 60B.

The embodiment of FIGS. 8 and 9 also show that the attachment feature 42 of the blade track segment 26 may be formed to include a chamfer 90B around an insertion end of the eyelet 54. The chamfer 90B is illustratively shaped to compress the compliant wrap 64B when the attachment pin 28B is inserted into the insertion end of the eyelet 54.

The compliant wrap 64 can be assembled into the blade track segment 26 eyelet 54 via two methods. The first would be by a large, gently sloped (small included angle) lead in chamfer 90B in the blade track segment 26 eyelet 54 end. The second would be an assembly tool (not shown) that would be placed against one end of the blade track segment 26 eyelet 54 that would pre-compress the compliant wrap 64 to just above the eyelet 54 diameter with a very gentle cone angle prior to entering the eyelet 54.

In this embodiment, the flanges 35, 36 of the carrier segment 24 are each optionally formed to include a cantilevered bore tube 91B, 92B and an engagement shoulder 93B, 94B. The cantilevered bore tubes 91B 92B have some flexibility relative to the rest of the carrier segment 24. The engagement shoulders 93B, 94B extend radially into the cantilevered bore tubes 91B, 92B and directly engage the shaft 60B of the attachment pin 28B. Accordingly, the cantilevered bore tubes 91B, 92B provide some compliance for the assembly segment 22B.

Figure 10:
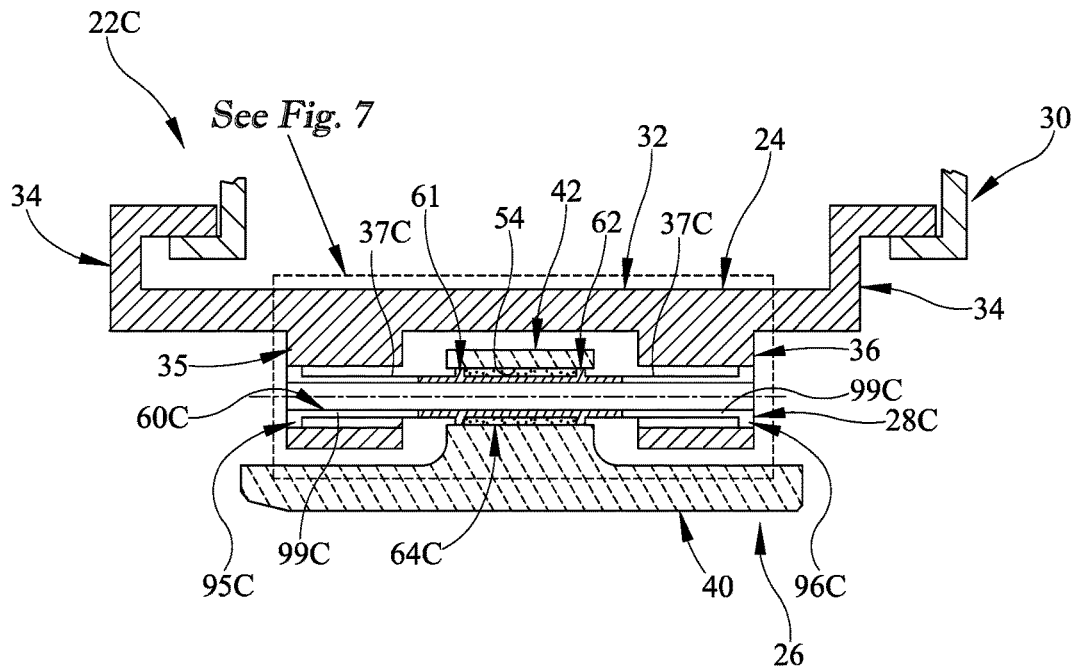
FIG. 10 is a view similar to FIG. 3 including a fourth turbine shroud segment adapted for use in the gas turbine engine of FIG. 1 showing a turbine shroud segment that includes a carrier segment made from metallic materials, a blade track segment made from ceramic matrix composite materials, and attachment pins with compliant features that couples the turbine shroud segment to the carrier segment while spreading out mounting/pressure loads applied on the ceramic matrix composite of the blade track segment.
Figure 11:
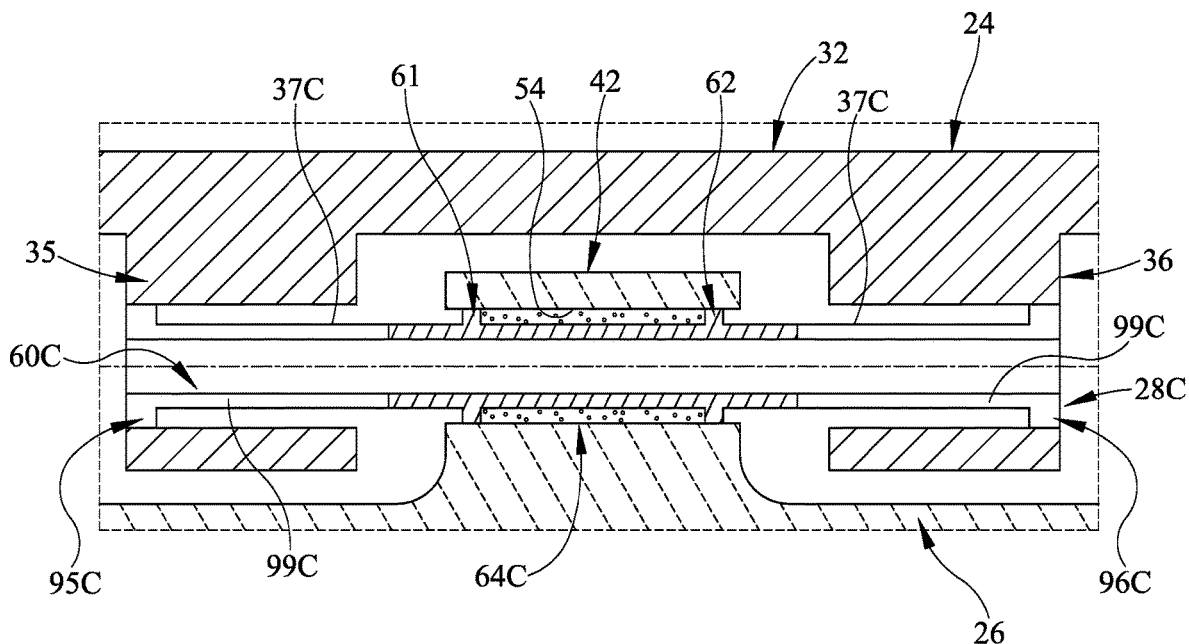
FIG. 11 is a detail view of FIG. 10 showing that each attachment pin includes a shaft, locator shoulders that extend out from the shaft to engage the blade track segment, support shoulders that extend out from the shaft to engage the metallic carrier segment, and a compliant wrap that extend around the shaft between the locator shoulders, and further showing slots formed in the shaft to provide compliance in the shaft in portions directly engaged with the carrier segment.
Figure 12:
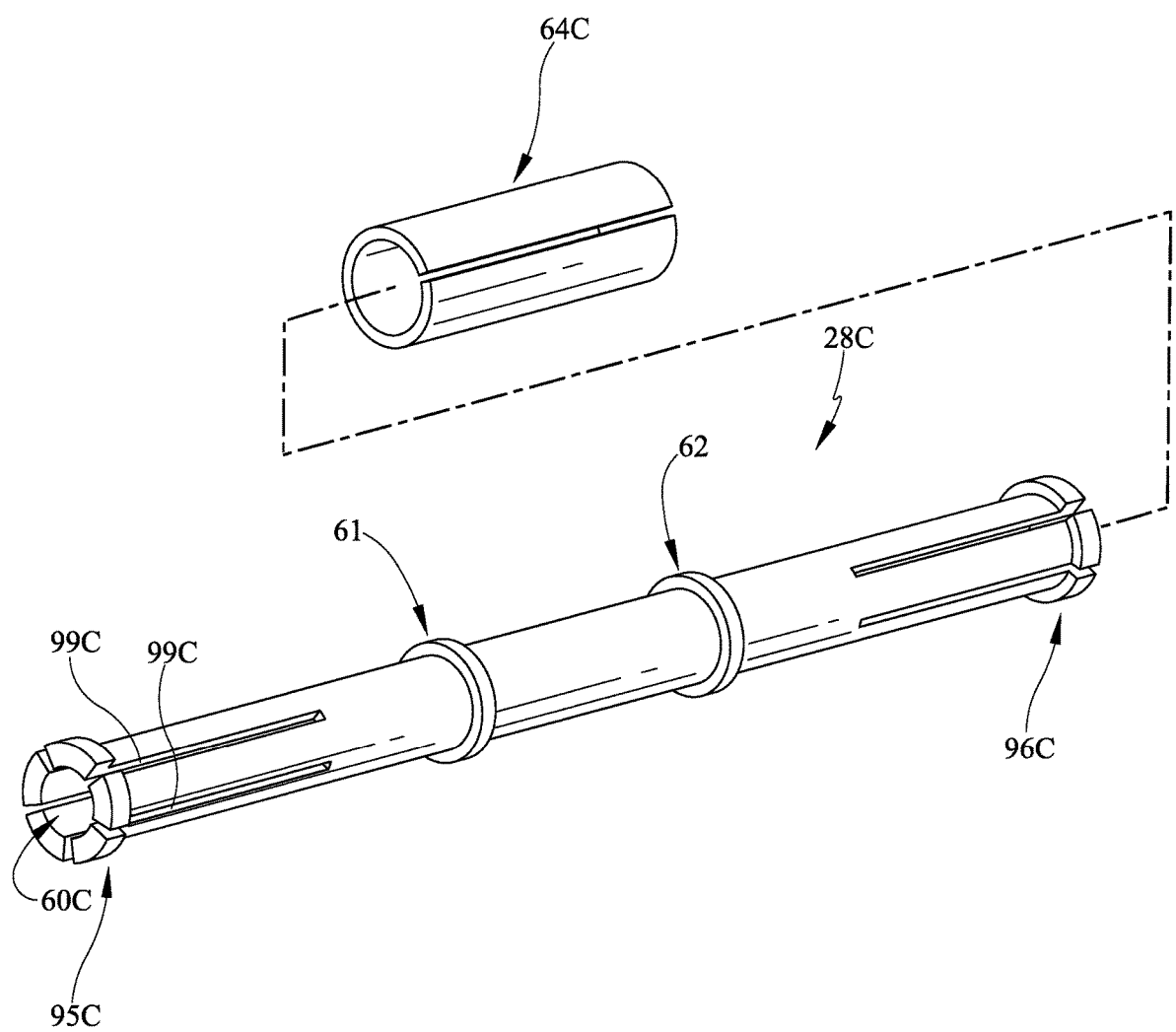
FIG. 12 is a perspective view of the attachment pin of FIGS. 10 and 11 showing the slots formed in the support shoulders and the shaft of the attachment pin.

A fourth embodiment of a turbine shroud segment 22C adapted for use in a turbine shroud is shown in FIGS. 10-12. The fourth embodiment is substantially similar to the turbine shroud segment 22 shown and described in relation to FIGS. 1-5. In view of this similarity, common reference numbers indicate similar features.

Unlike turbine shroud segment 22, the turbine shroud segment 22C does not include compliant wrap pieces that interface with the carrier segment 24 as shown in FIGS. 10 and 11. Rather, compliant wrap 64C of attachment pin 28C is sized and arranged in eyelet 54 of blade track segment 26 to engage only the blade track segment 26. Apertures 37C of the forward and aft support flanges 35, 36 included in the carrier segment 24 are sized to directly engage shoulders 95C, 96C that extend out from the shaft 60C of the attachment pin 28C.

Optionally, slots 99C are formed in the ends of the shaft 60C included in the attachment pin 28C. The slots 99C provide compliance of the pin 28C at the interface with the carrier segment 24. It will be appreciated that such slots may be included in any of the attachment pins described in this paper.

While the present disclosure specifically teaches the use of a mounting system in a turbine shroud having ceramic matrix composite blade track segments, it is contemplated that other assemblies may benefit from features of the specific design described. In one example, the mounting system and/or other features of the present disclosure may be incorporated into a combustor having ceramic matrix composite liner tiles that surround the combustion chamber. In another example, the mounting system and/or other features of the present disclosure may be incorporated into an exhaust assembly having ceramic matrix composite heat shields. In yet another example, the mounting system and/or other features of the present disclosure may be incorporated into heat shields for spacecraft. Moreover, the teachings of the present disclosure may be applied to any assembly facing high temperature operating conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted to be mounted outward of blades included in a turbine wheel assembly and adapted to block gasses from passing over the blades, the turbine shroud comprising
a carrier segment comprising metallic materials and configured to be mounted to other metallic components within a gas turbine engine,
a blade track segment comprising ceramic matrix composite materials, the blade track segment including a runner that extends partway around a central axis to face a primary gas path of the gas turbine engine and a first attachment feature with a first eyelet formed through the first attachment feature,
a first attachment pin configured to couple the blade track segment to the carrier segment, the first attachment pin including a first shaft comprising metallic materials that extends through the first eyelet in the first attachment feature of the blade track segment and a first compliant wrap that extends around the first shaft along at least a portion of the first shaft arranged inside the first eyelet, wherein the first compliant wrap has greater material compliance than the first shaft so that loads applied onto the blade track segment by the first attachment pin are distributed along the first attachment feature of the blade track segment, and
wherein the first attachment pin includes locator shoulders comprising metallic materials that extend out from the first shaft to directly engage the first attachment feature of the blade track segment.

2. The turbine shroud of claim 1, wherein the first compliant wrap is arranged along a length of the first attachment pin between the locator shoulders.

3. The turbine shroud of claim 2, wherein the first compliant wrap includes a plurality of wrap sections, the plurality of wrap sections including a first wrap section arranged between the locator shoulders, a second wrap section arranged forward of the locator shoulders, and a third wrap section arranged aft of the locator shoulders.

4. The turbine shroud of claim 3, wherein the carrier segment is formed to include a forward mount aperture and an aft mount aperture, the first attachment feature of the blade track segment is located so that the first eyelet of the blade track segment aligns with the forward mount aperture and the aft mount aperture, and the first attachment pin extends into the forward mount aperture and the aft mount aperture with the second wrap section arranged in the forward mount aperture and the third wrap section arranged in the aft mount aperture.

5. The turbine shroud of claim 2, wherein the carrier segment is formed to include a forward mount aperture and an aft mount aperture, the first attachment feature of the blade track segment is located so that the first eyelet of the blade track segment aligns with the forward mount aperture and the aft mount aperture, and the first attachment pin extends into the forward mount aperture and the aft mount aperture with forward and aft portions of the first shaft directly engaging the carrier segment.

6. The turbine shroud of claim 5, wherein undercuts are formed in the shaft of the first attachment pin, a first undercut is located in a first location along the first attachment pin between the locator shoulders and a forward portion of the first shaft, and a second undercut is located in a second location along the first attachment pin between the locator shoulders and an aft portion of the first shaft.

7. A turbine shroud adapted for a gas turbine engine, mounted outward of blades included in a turbine wheel assembly and adapted to block gasses from passing over the blades, the turbine shroud comprising a carrier comprising metallic materials, a blade track segment comprising ceramic matrix composite materials, the blade track segment including a runner that extends partway around a central axis and an attachment feature with an opening formed through the attachment feature, and an attachment pin configured to couple the blade track segment to the carrier segment, the attachment pin including a shaft that extends through the opening in the attachment feature of the blade track segment and a compliant wrap that extends around the shaft along at least a portion of the shaft arranged inside the opening, wherein the compliant wrap has greater material compliance than the shaft, wherein the attachment pin includes locator shoulders that extend out from the shaft to directly engage the attachment feature of the blade track segment.

8. The turbine shroud of claim 7, wherein undercuts are formed in the shaft of the attachment pin, a first undercut is located in a first location arranged radially inward of and axially aligned with a forward edge of the opening defined by the attachment feature of the blade track segment, and a second undercut is located in a second location arranged radially inward of and axially aligned with an aft edge of the opening defined by the attachment feature of the blade track segment.

9. The turbine shroud of claim 7, wherein the compliant wrap is arranged along a length of the attachment pin between the locator shoulders.

10. The turbine shroud of claim 9, wherein the compliant wrap includes a plurality of wrap sections, the plurality of wrap sections including a first wrap section arranged between the locator shoulders, a second wrap section arranged forward of the locator shoulders, and a third wrap section arranged aft of the locator shoulders.

11. The turbine shroud of claim 7, wherein the attachment feature is formed to include a chamfer around an insertion end of an eyelet.

12. A turbine shroud comprising a carrier comprising metallic materials, a blade track segment comprising ceramic matrix composite materials, the blade track segment including a runner that extends partway around a central axis and an attachment feature with an opening formed through the attachment feature, and an attachment pin configured to couple the blade track segment to the carrier segment, the attachment pin including a shaft that extends through the opening in the attachment feature of the blade track segment and into the carrier, wherein the attachment pin is formed to include slots in at least a portion of the shaft that extends into the carrier.

13. The turbine shroud of claim 12, wherein the attachment pin includes shoulders that extend out from the shaft and into direct contact with the carrier and the slots extend through the shoulders.

* * * * *